United States Patent
Ierfone et al.

(10) Patent No.: US 7,995,787 B2
(45) Date of Patent: Aug. 9, 2011

(54) SOUND EMITTING DEVICE

(75) Inventors: Frank Anthony Ierfone, Mount Waverly (AU); Robert Ian Edgar, Wheelers Hill (AU)

(73) Assignee: Sonic Grip Limited, Mount Waverley, Victoria (AU)

( * ) Notice: Subject to any disclaimer, the term of this patent is extended or adjusted under 35 U.S.C. 154(b) by 985 days.

(21) Appl. No.: 11/771,661

(22) Filed: Jun. 29, 2007

(65) Prior Publication Data

US 2008/0037818 A1    Feb. 14, 2008

Related U.S. Application Data

(62) Division of application No. 10/493,331, filed as application No. PCT/AU02/01429 on Oct. 21, 2002, now abandoned.

(30) Foreign Application Priority Data

Oct. 21, 2001 (AU) ........................................ PR8379
Dec. 28, 2001 (AU) ........................................ PR9772

(51) Int. Cl.
*H04R 1/02* (2006.01)
*B62J 3/00* (2006.01)
*B62J 6/00* (2006.01)

(52) U.S. Cl. .................... 381/389; 381/386; 340/432

(58) Field of Classification Search .................... 381/389
See application file for complete search history.

(56) References Cited

U.S. PATENT DOCUMENTS

| | | | |
|---|---|---|---|
| 2,416,160 A * | 2/1947 | Davidsson | 340/432 |
| 4,278,274 A | 7/1981 | Ray | |
| 4,824,139 A | 4/1989 | Robbins | |
| 4,856,364 A | 8/1989 | Dixon | |
| 5,004,256 A | 4/1991 | Won | |
| 5,067,058 A | 11/1991 | Standley | |
| 5,083,108 A * | 1/1992 | Guest | 340/432 |
| 5,130,693 A | 7/1992 | Gigandet | |
| 5,292,141 A | 3/1994 | Ekedal et al. | |
| 5,330,026 A | 7/1994 | Hsu | |
| 5,539,259 A | 7/1996 | Filion et al. | |
| 7,053,289 B2 | 5/2006 | Iwai et al. | |
| 7,138,774 B2 | 11/2006 | Negoro et al. | |
| 2002/0167415 A1 | 11/2002 | Rains et al. | |

(Continued)

FOREIGN PATENT DOCUMENTS

CA        2061324 A        8/1993

(Continued)

OTHER PUBLICATIONS

Chambrier, et al., Synthesis, Oct. 1995, pp. 1283-1286, "Synthesis and Characterisation of Functionalised Phthalocyanine Compounds for Fabrication of Self-Assembled Monolayers".

(Continued)

*Primary Examiner* — Curtis Kuntz
*Assistant Examiner* — Matthew Eason
(74) *Attorney, Agent, or Firm* — Volpe and Koenig, P.C.

(57) ABSTRACT

A sound emitting assembly inserted into a body or frame (106) or handgrip of a personal transport means (90) said assembly comprising: (i) a package comprising an electronically actuated sound generator, an electronic circuit to feed a signal to the sound generator and a source of stored electric power, and (ii) an actuating switch (118) separated from the package and linked to the package by an electric pathway (119) such that when the switch (118) is activated by the user, a sound is emitted from said body or frame (106) or handgrip distant from the switch (118).

8 Claims, 10 Drawing Sheets

U.S. PATENT DOCUMENTS

| | | | |
|---|---|---|---|
| 5,601,359 A * | 2/1997 | Sharrah et al. | 362/204 |
| 5,873,600 A | 2/1999 | Conway | |
| 6,050,357 A | 4/2000 | Staelin et al. | |
| 6,623,326 B2 | 9/2003 | Judkins | |
| 6,828,916 B2 | 12/2004 | Rains et al. | |
| 7,053,288 B2 | 5/2006 | Iwai et al. | |

FOREIGN PATENT DOCUMENTS

| | | |
|---|---|---|
| DE | 29614130 A | 12/1996 |
| EP | 1033155 A1 | 9/2000 |
| WO | 9710811 A | 3/1997 |
| WO | 0108660 A | 2/2001 |

OTHER PUBLICATIONS

Hone, et al., Langmuir, 18, 2002, pp. 2985-2987, "Generation of Cytotoxic Singlet Oxygen via Phthalocyanine-Stabilized Gold Nanoparticles: A Potential Delivery Vehicle for Photodynamic Therapy".

* cited by examiner

SOUND EMITTING DEVICE

CROSS REFERENCE TO RELATED APPLICATIONS

This application is a division of U.S. patent application Ser. No. 10/493,331, filed Oct. 12, 2004, which is a 371 of International Application No. PCT/AU02/01429 filed Oct. 21, 2002, which are incorporated by reference as if fully set forth.

FIELD OF INVENTION

This invention concerns the incorporation of audible sound emitting devices onto or into personal transport means. In one adaptation it has particular application to bicycles, tricycles, wheelchairs and other transport means having a tubular frame, but other adaptations are particularly applicable to skateboards, rollerskates, rollerblades and the like. The sound emitting devices may be used as an alarm, a warning device or as a means of greeting or identification.

BACKGROUND

A wide variety of warning devices is available in the marketplace for use on bicycles and tricycles. These include conventional bicycle bells and air horns with rubber bulbs. Also known are battery powered buzzers which attach to the handlebars in much the same way as a conventional bicycle bell, and which have a button on the casing of the buzzer which, when pressed, causes an appropriate noise to be emitted from the casing.

Existing warning devices protrude out substantially from the frame of the bicycle, are not well protected from the elements or from knocks, and detract from the clean lines of the machine.

An aim of one aspect of the present invention is to provide a sound emitting device which may be used as a warning device which overcomes the abovementioned difficulties on a tubular framed transport means such as a bicycle.

The use of skateboards, rollerskates and rollerblades is increasing and these are increasingly involved in collisions with pedestrians. Such collisions often cause significant injury particularly to elderly pedestrians. The riders of these sporting and personal transport means tend to be young, fit and resilient to such impacts, so often travel at speeds where they can find that a warning device is important to avoid a collision.

In many places it is mandatory to have a warning device fitted to a bicycle and it would be desirable to have such warning devices available for skateboards, rollerblades and the like, perhaps even making the fitment of such warning devices compulsory in areas subject to normal pedestrian traffic.

An aim of one aspect of the present invention is to provide a sound emitting device which may be used as a warning device and which can be incorporated into the body of rollerskate or rollerblade footwear, or into the body of a skateboard, and which may be easily actuated by the rider, provides adequate audible warning of their approach, and is built into said body in such a way that it is substantially protected from physical damage in the often very rough treatment accorded to skateboards, rollerblades and the like.

Users of personal transport means such as bicycles, skateboards, rollerblades and the like often wish to personalise their equipment. An aim of one aspect of the present invention is to provide a means by which owners of such personal transport means can personalise such equipment by incorporating a sound emitting device which produces a musical tune or other preset sound or sounds chosen by the user. Such sounds may function as an alarm or warning device or as merely a means of identification, greeting or of self expression.

SUMMARY

Accordingly, in one aspect the invention provides a sound emitting assembly inserted into a body or frame or handgrip of a personal transport means said assembly comprising:
  (i) a package comprising an electronically actuated sound generator, an electronic circuit to feed a signal to the sound generator and a source of stored electric power, and
  (ii) an actuating switch separated from the package and linked to the package by an electric pathway such that when the switch is activated by the user, a sound is emitted from said body or frame or handgrip distant from the switch.

In another aspect the invention provides a handgrip including a sound emitting assembly according to claim 1 and adapted to be slid over a tube end and into an end portion of a tubular handlebar, the handgrip having:
  (i) a gripping portion adapted to be retained on the outside surface of said end portion of the handlebar, and having a proximal end at or closely adjacent the end of the tube and having a distal end along the outside of the tube away from the tube end,
  (ii) said package of electronic components and electric power source adapted to be retained on the inside of the end portion of the handlebar, said package having a proximal end at or closely adjacent the end of the tube and having a distal end positioned within the end portion of tube but away from the tube end, and
  (iii) said actuating switch located in said gripping portion distal of the tube end.

The gripping portion may comprise a flexible material, for example a resilient foam, which overlies the switch and the switch is actuated by digitally depressing the handgrip where it overlies the switch. The gripping portion may be slotted or grooved to accommodate therein conducting elements which provide the electric pathway between the switch and the package of electronic components.

The electric pathway may comprise conducting wires or strips which pass from inside to outside the tube at the end of the tube, and pass beneath the gripping portion to the switch.

The package of electronic components and electric power source may include a piezoelectric sound generator at said proximal end whereby sound emanating from the sound generator is directed out through said tube end.

The package of electronic components and electric power source may comprise a package case closed at said distal end and having a releasable end cap at said proximal end, whereby releasing said end cap permits the stored electric power source to be replaced without removal of the remainder of the package from within the tube. The end cap may include the piezoelectric sound generator.

The stored electric power source may comprise one or more dry cell batteries held within a frame and, with the end cap removed, the frame may be at least substantially withdrawn from within the package and the batteries replaced while the package case remains in the tube and the frame remains electrically connected to the switch.

In another aspect the invention provides a skateboard comprising a deck with a truck affixed thereto and a sound emitting assembly, wherein the package electronic components and electric power source are retained in the truck and said actuating switch is actuated by pressing onto portion of the deck.

In another aspect the invention provides a personal transport means including a body or frame or handgrip into which is inserted a sound emitting device, said device comprising:
 (i) a package comprising an electronically actuated sound emitter, an electronic circuit to feed a signal to the sound emitter and a source of stored electric power, and
 (ii) an actuating switch separated from the package and linked to the package by an electric pathway such that when the switch is activated by the user, a sound is emitted from said body distant from the switch.

The personal transport means may include a tubular handlebar having an end portion terminating at a tube end rim and onto which a handgrip is fitted, said handgrip comprising:
 (i) a gripping portion adapted to be retained on the outside surface of the handlebar tube,
 (ii) a casing containing said package of electronic components and electric power source and retained on the inside of said end portion of the handlebar tube, said package having a proximal end at or closely adjacent the tube end and having a distal end positioned within the end portion away from the tube end, and
 (iii) said actuating switch located in said gripping portion distal of the tube end.

The personal transport means may include a skateboard having wheels mounted on a truck, which is in turn attached to the lower side of a skateboard deck, and wherein:
 (i) said package of electronic components and electric power source is at least partly contained within a housing in the truck, and
 (ii) said actuating switch is located on the upper side of the deck.

The personal transport means may further comprise a skateboard having wheels mounted on an axle frame, which is in turn resiliently attached to an axle support, which is in turn attached to the lower side of a skateboard deck, and wherein:
 (i) said package of electronic components and electric power source is at least partly contained within a housing in the axle support, and
 (ii) said actuating switch is located on the upper side of the deck.

The package of electronic components and electric power source may be accommodated partly within said housing in the axle support and partly within an adjoining recess formed into the lower side of the deck.

The electric power source may be a dry cell or dry cell battery which may be slid from within the housing upon removal of an access cap provided in a side of said housing.

The sound emitting device may be a piezoelectric sound generator mounted within the housing in the axle support. The piezoelectric sound generator may be mounted to deliver most of its sound through an orifice or orifices substantially positioned directly above the axle's longitudinal axis. The electric pathway may gain access to the housing in the axle support through a hole formed centrally between screws which affix the axial support to the deck.

In another aspect the invention provides a handgrip including a sound emitting assembly and adapted to be slid onto an end portion of a handlebar, the handgrip comprising a body having contained therein a piezoelectric transducer, an electronic circuit which can generate a signal for causing the transducer to create a noise, a source of stored electric power, and an actuating switch to selectively feed said signal to the piezoelectric transducer.

The sound emitting device may produce sound loud enough to act as a warning to pedestrians and users of other transport means.

When used on a bicycle, tricycle or other vehicle with handlebars, the package comprising the sound emitter, signal generator and battery preferably comprises a generally cylindrical portion which slips inside one end of the tubular handlebar, with the actuating switch on the outside of the tubular handlebar. Preferably one end of the package is retained approximately flush to one end of the handlebar and preferably that one end of the package comprises said sound emitter. The electrical pathway connecting said package to the switch may comprise a wire or wires, or laminar conducting strip such as metallic strip or a metallised film, extending from the end of the handlebar underneath a handgrip which is slid onto the handlebar with the switch taking the form of a button or pressure pad positioned at the inboard end of the handgrip for convenient actuation by the thumb or other finger of the user.

Alternatively the switch may provide a hydraulic or pneumatic actuation of the electronic components in said package.

The switch may take any convenient form but is preferably only held in the "circuit connected" position by continuous pressure thereon, that is it moves to the "disconnected" position when pressure ceases.

BRIEF DESCRIPTION OF THE DRAWINGS

In order that the invention may be more fully understood there will now be described, by way of example only, preferred embodiments and other elements of the invention with reference to the accompanying drawings where.

DETAILED DESCRIPTION OF THE PREFERRED EMBODIMENTS

Figure 1:
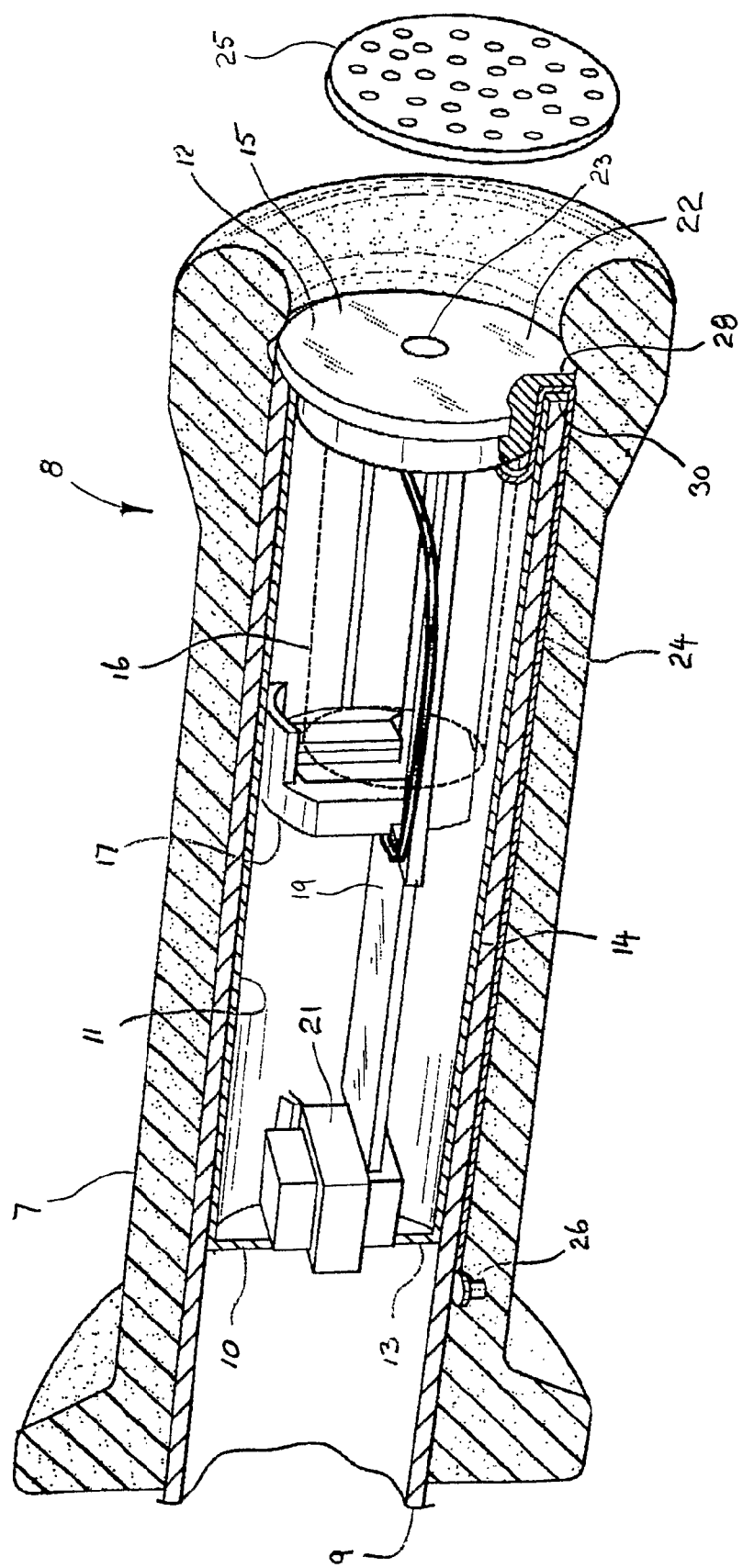
FIG. 1 is a cut-away view of a first embodiment of a first adaptation of the invention as it is applied for use with the handlebars of a bicycle.

Referring to FIG. 1, one embodiment of the invention takes the form of a handgrip 8 shown fitted to one end of the handlebars of a bicycle. The handgrip 8 incorporates a sound emitting device which may act as a warning device. The handgrip 8 has a gripping portion 7 made of soft resilient foam material which slips over the outside of the handlebar tube 9 and an internal package portion 10 which is a sliding fit into the handlebar tube 9. The package 10 has a tubular casing 11 formed with one closed end 13. The opposite end of the casing 11 is open to form a tubular mouth 15.

A disc-shaped piezoelectric loudspeaker 12 (buzzer) is positioned with its cylindrical axis in line with the general axis of the casing. The buzzer 12 comprises a standard commercially available piezoelectric wafer mounted within a moulded plastic soundreinforcing chamber and with a single hole 23 centrally located on a circular face 22 to assist sound dispersion. The buzzer 12 covers the mouth 15 of the casing 11 and is removably affixed to the casing 11 by means of a press fit connection. Alternatively, a bayonet connection or a threaded connection may be used but a click-locking pressfit connection is preferred. Optionally a perforated cover 25 may be fitted over the face 22 of the buzzer. For clarity the cover 25 is shown detached in FIG. 1.

Next to the buzzer 12, and within the casing 11, is positioned a single A23 E23A 12 volt dry cell battery 16 held within a battery cradle 17 between spring loaded contacts 18 and 20 moulded into the cradle 17. Next to the battery 16 is an assembly 14 of electronic circuitry (including a printed circuit board 19 and a voltage transformer 21) for signal generation. The contacts 18 and 20 are electrically connected into the electronic circuitry in assembly 14.

The casing of the buzzer 12 carries a circumferentially outwardly extending flange 28 which extends over the thin axial end face (or rim) 30 of the tubing 9 and prevents the buzzer being pressed too far into the handlebar end. Wedged between the tubing 9 and the peripheral face of the disc shaped buzzer 12 is a thin metal strip 24 which is folded back to extend along most of the length of the handgrip 8 and for slightly longer than the length of the casing 11. At the free end of the strip 24, a switch 26 is located. This is a "normally-open push button" switch.

In use the whole cylindrical package 10 (including the tubular casing 11 and the buzzer 12) is slid into an open end of a handlebar tube 9 such that the casing 11 is inside the handlebar tube and the strip 24 extends along the outside of the handlebar tube. A conventional foam or other type of handgrip is then positioned over the end portion of the handlebar to cover the strip 24 and the actuating switch 26.

A bicycle may use a sound emitting device as described on each side of the handlebars, but two such handgrips are not necessary. Only one sound emitting handgrip may be used with the other handgrip being chosen to provide a visual match but without the electronic componentry.

The bulk material of the strip 24 may be electrically conductive and form part of the electrical circuit containing the switch 26, with the electrical circuit being completed through the metal of the handlebar and the switch being a relatively simple contact and release device bearing onto the outside of the handlebar. However it is preferred that the strip 24 carries both conducting paths to the switch 26 and in such an embodiment the strip may be made largely of plastics or other electrically insulating material with the appropriate conducting wires or other pathways held therein or thereon. Such a preferred arrangement would provide improved reliability of electrical continuity.

Figure 2:
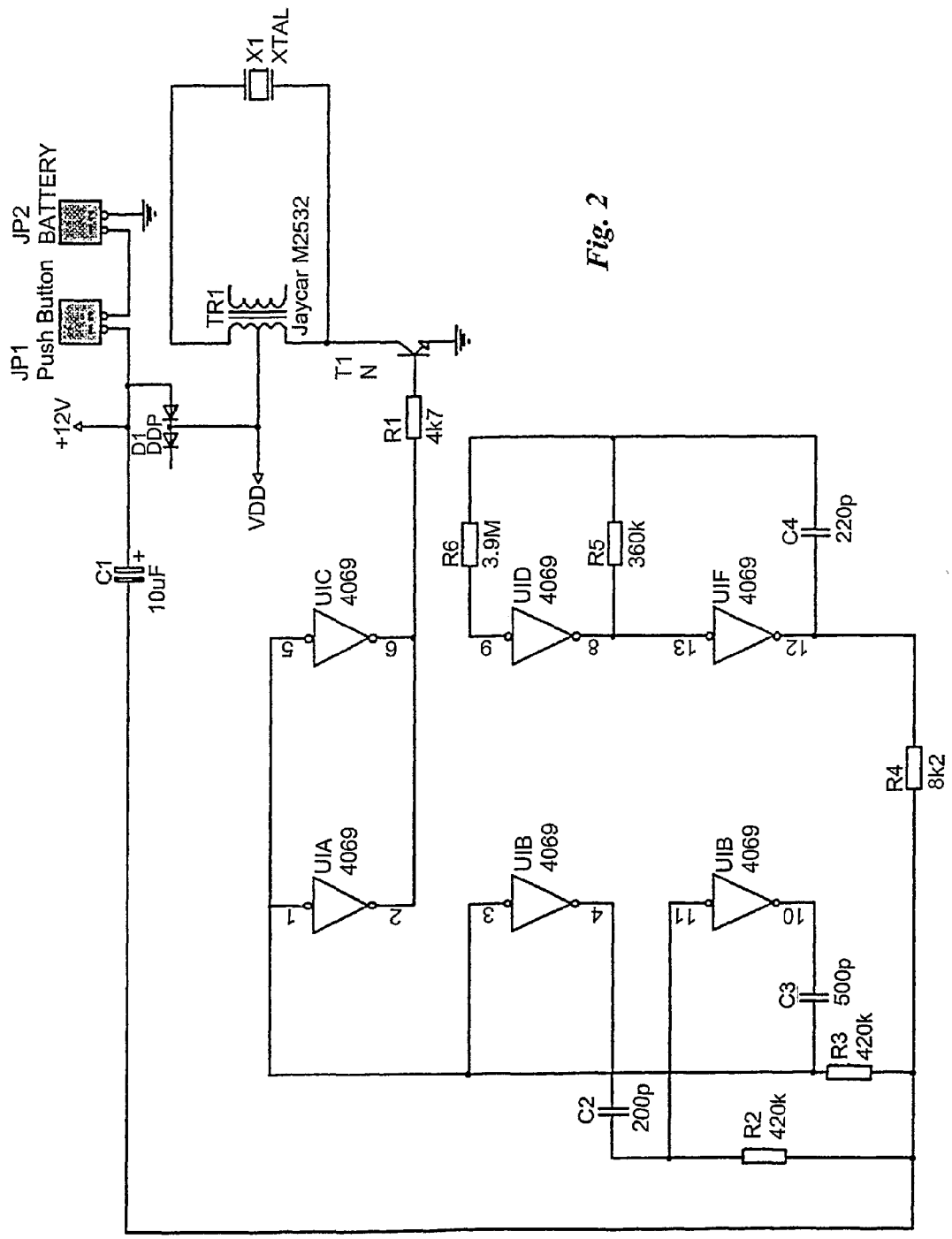
FIG. 2 is a circuit diagram for electronic components used in the embodiment of the invention shown in FIG. 1.

The electronic components and circuitry required for construction of the contents of the electronics assembly 14 are readily apparent to the skilled person from FIG. 2. The 1C used is a Philips HEF 4069UBP 980870PS Hnn9348P3. The transformer is sold in Australia by Jaycar Electronics under catalogue no. M2532 and has primary/secondary 1KΩct/8Ω. The piezo transducer is a Kingsgate KPE-812 order no. 927-065.

It should be noted that for ease of understanding the configuration of the embodiment shown in FIG. 1, some of the electronic components have been omitted from FIG. 1. In particular the integrated circuit chip, resistors, diodes and capacitors which would be fitted to the printed circuit board 19 are not drawn. The transformer 21 is shown as it has a large volume relative to the components not shown.

Figure 3:
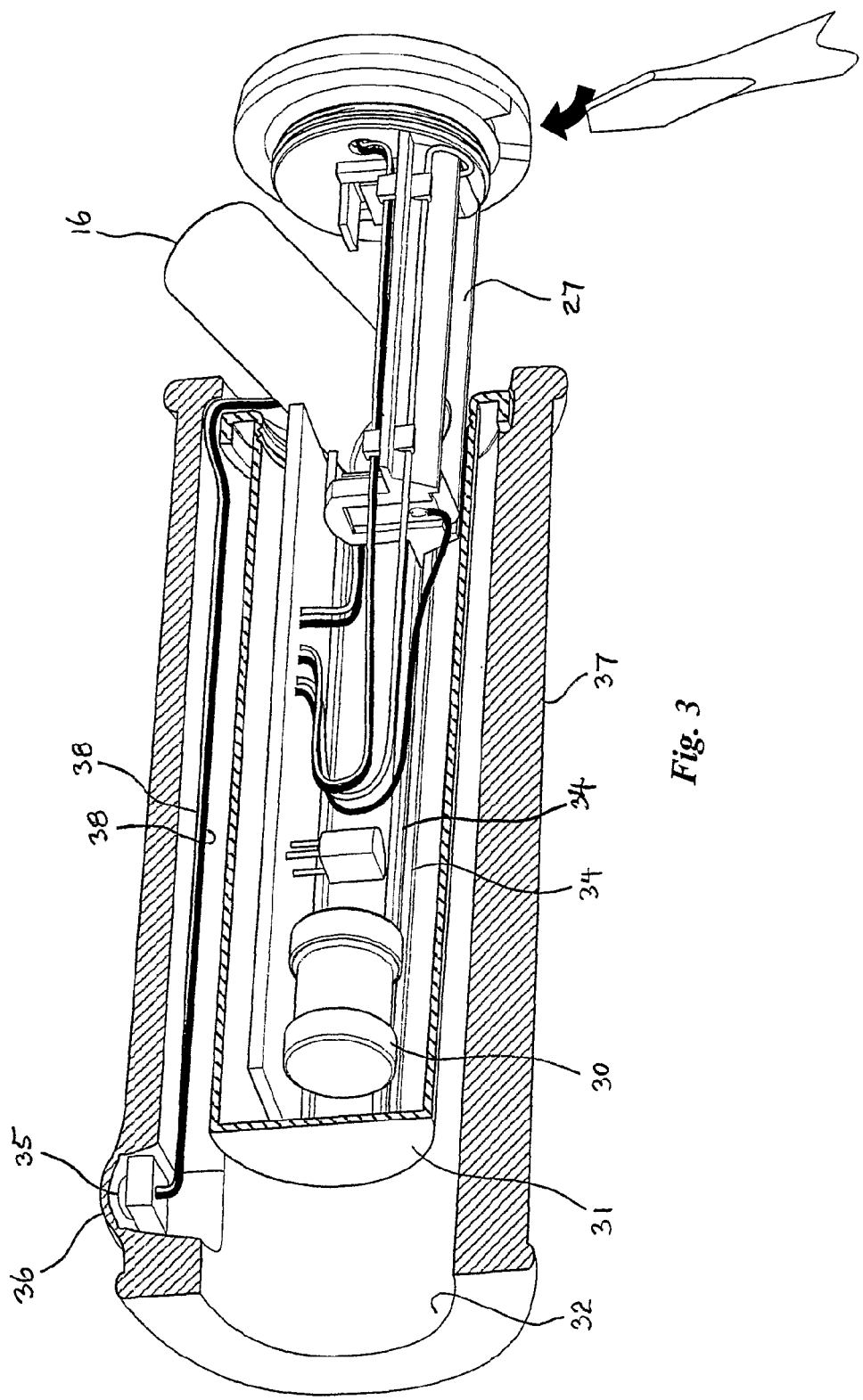
FIG. 3 is a cut-away view of a second embodiment of the first adaptation, shown with some portions moved into position for battery replacement.
Figure 4:
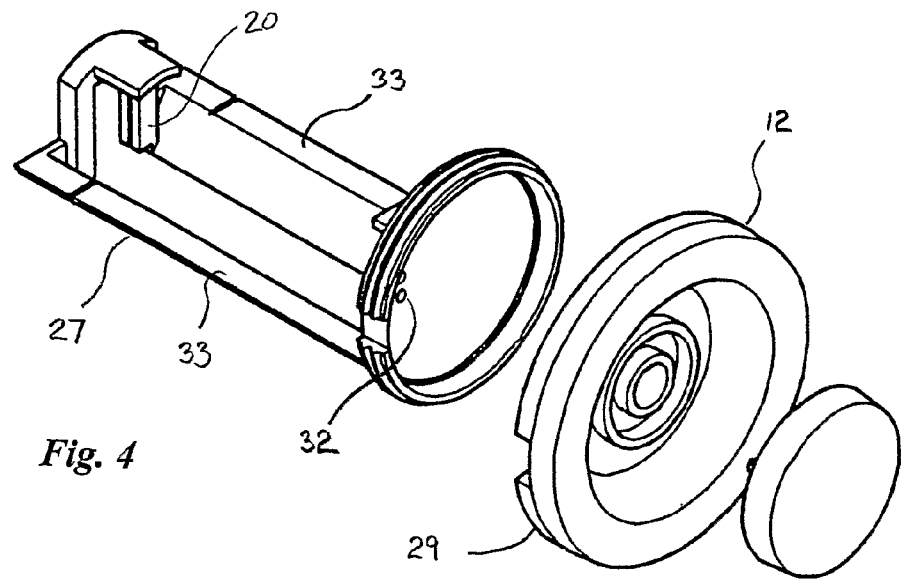
FIG. 4 is an exploded perspective view of some of the components shown in FIG. 2.
Figure 5:
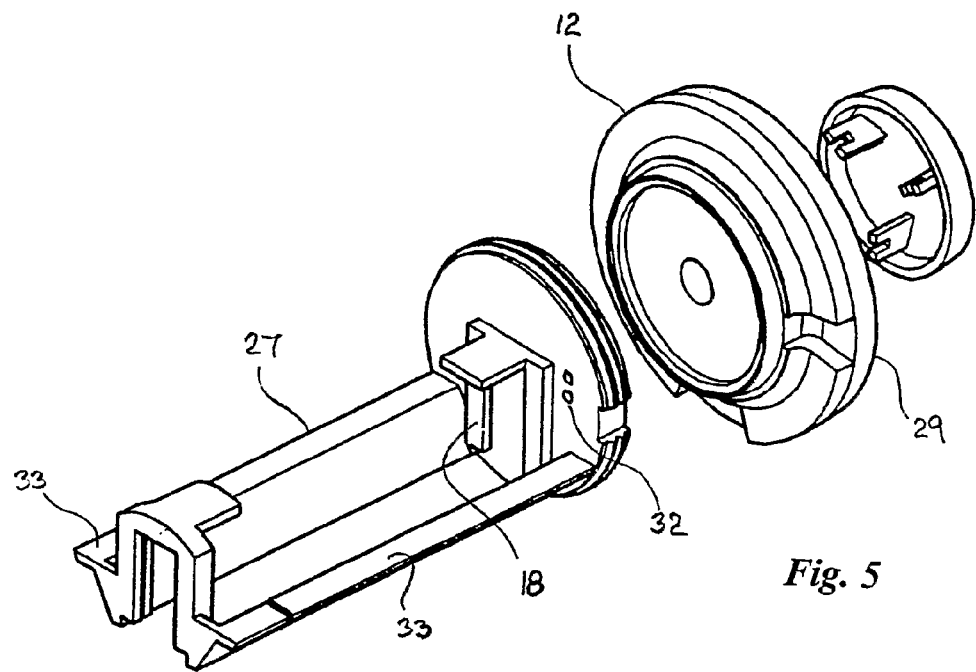
FIG. 5 is a view of the arrangement shown in FIG. 3 shown from a different angle.

Referring now to FIGS. 3 to 5, it should first be noted that to aid clarity the metal tube of the handlebars has been omitted from FIG. 3. The embodiment of the invention shown in FIG. 3 has the following major differences to that shown in FIG. 1:

1. A toroidal transformer 300 is used instead of the more conventionally shaped transformer 21 in FIG. 1.
2. The printed circuit board (PCB) 32 runs the full length of the tubular casing 31 and remains fixed at both ends during battery changes. A more rigid and reliable structure results.
3. As the cradle 27 for the battery 16 slides out of the casing 31 it is supported by its side flanges 33 which are each held in sliding fit between respective pairs of parallel ribs 34 moulded on the wall of the casing 31.
4. The push button switch 35 is located in a recess within a localised bulge 36 in the foam gripping portion 37. This holds the switch more securely than the arrangement shown in FIG. 1.
5. The switch 35 is electrically linked to the PCB by a pair of wires 38 whereas a metal strip was used in FIG. 1. The wires 38 are carried within a longitudinal groove or channel formed in the foam gripping portion 37 and opening into the inside wall 32 of the foam.

The actual piezoelectric transducer is not shown in FIGS. 3 to 5. It comprises a circular wafer shaped component which is held between the body 29 of the buzzer 12 and the end flange of the cradle 27 to which the body 29 is welded. The two leads for the piezo gain access through a pair of holes 32 in the end flange.

Figure 6:
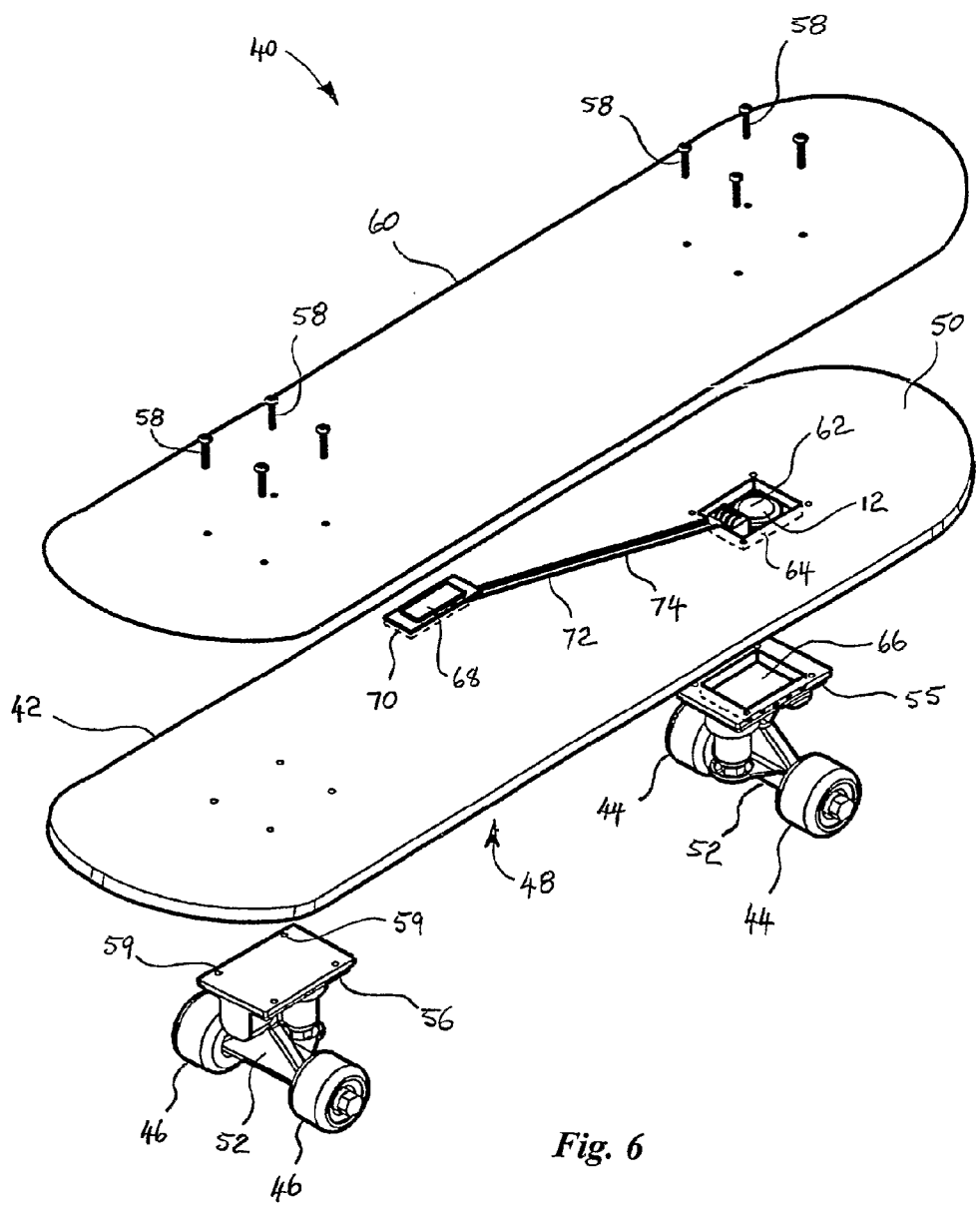
FIG. 6 is an exploded perspective view of a skateboard incorporating a first embodiment of a second adaptation of the invention.

A second adaptation of the invention is for use with skateboards. Referring to FIG. 6, a skateboard 40 has an upper portion, comprising a generally planar main body or deck 42 made of wood or composite polymer material, with two pairs 44 and 46 of wheels attached to the deck 42 in contact with the underside 48 of the deck 42. Each pair of wheels 44 and 46 is attached to corresponding stub axles carried on an axle frame 52 which is in turn resiliently attached to a respective mount or stanchion or axle support 56 which is in turn rigidly attached by machine screws 58 to the underside of the deck 42 of the skateboard. The screws 58 may be engaged with threads in holes 59 in the mounts 56 or may be retained by nuts (not shown). In relation to terminology, the terms "mount", "stanchion" and "axle support" have herein been used interchangeably. It is also common for a whole undercarriage structure (ie. an axle frame including axles, plus an axle support to be called a "truck").

A package 62 comprising an electronic circuit, battery and sound emitter is accommodated within the combined space provided by a rectangular cutout 64 in the deck 42 and a recess 66 in one of the stanchions 55. The cutout 64 immediately overlies the recess 66 so the cavity created by their combined spaces is sufficient for the purpose. The central location also means the electronic components are relatively well protected.

The actuating switch 68 is conveniently fixed into a recess 70 cut into the main body 42 close to the edge of the skateboard. The switch 68 is connected to the package 62 by wires 72, conducting strips or the like running in a shallow groove or trench 74 cut into the top surface 50 from the recess 70 to the recess 66. If such electrical connection is provided by a flat strip carrying printed conducting strips, it may not need to be recessed into the top surface 50.

Locating the switch 68 near the edge of the skateboard provides for some users an improved ease of use of the switch when compared with a more central location. Locating the switch 68 a little inboard from the edge of the skateboard provides improved protection of the switch from impact and abrasion. The separation of the switch 68 from the package 62 thus allows optimal location for each.

The top side 50 of the main body (or deck) 42 is almost completely covered by a flexible overlay sheet 60 which is adhered to the top face of the skateboard. The sheet 60 covers the buzzer 12 and the switch 68. The sheet material is thin, flexible and resilient enough for the switch to be actuated through it and for effective transmission of the buzzer noise through it. A heavy duty polymer sheet is preferred. The sheet may have printed thereon a suitable decorative design and/or have one or more areas of heavily textured surface (like sandpaper) to facilitate foot grip in use. Some small perforations may be provided in the sheet 60 immediately above the cutout 64 in order to increase the sound levels produced.

In a variation of the above described embodiment for use with skateboards, a package comprising the electronic circuit and the battery may be accommodated within a recess in one of the stanchions while both the sound emitter and switch are accommodated within a form-fitting recess, or respective form fitting recesses, cut into the body on the upper side of the skateboard. Positioning the sound emitter in this way may provides even greater protection for it.

Alternatively, by using appropriately small components, the electronic circuit, the battery, the sound emitter and switch may all be accommodated within a recess cut into the body on the upper side of the skateboard.

Also alternatively the package comprising the electronic circuit, the battery and sound emitter may be accommodated within a recess in one of the stanchions which retain the axles on which the wheels rotate. This is illustrated in FIGS. 7 to 9.

Figure 7:
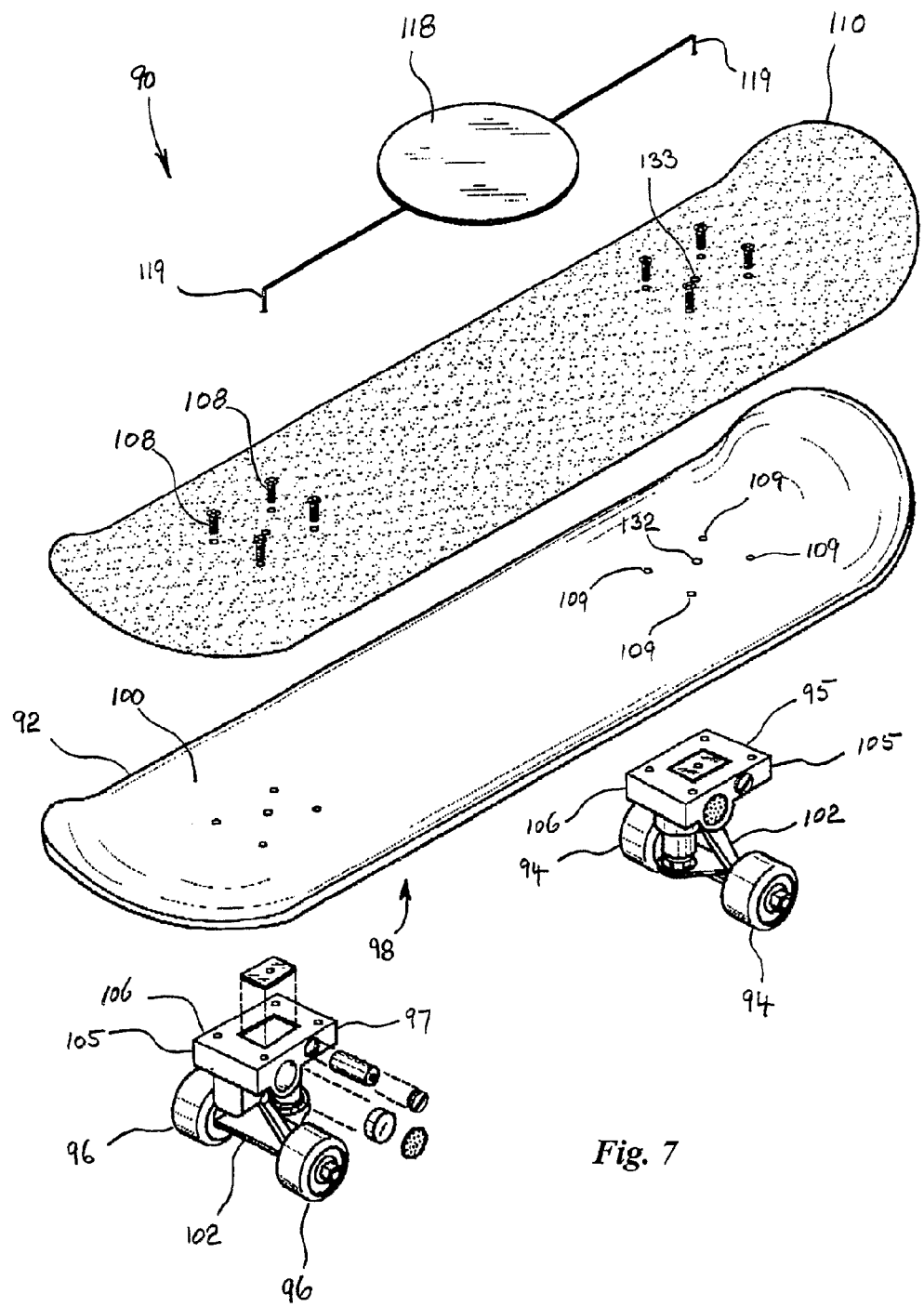
FIG. 7 is an exploded perspective view of a skateboard incorporating a second and preferred embodiment of the second adaptation of the invention.
Figure 8:
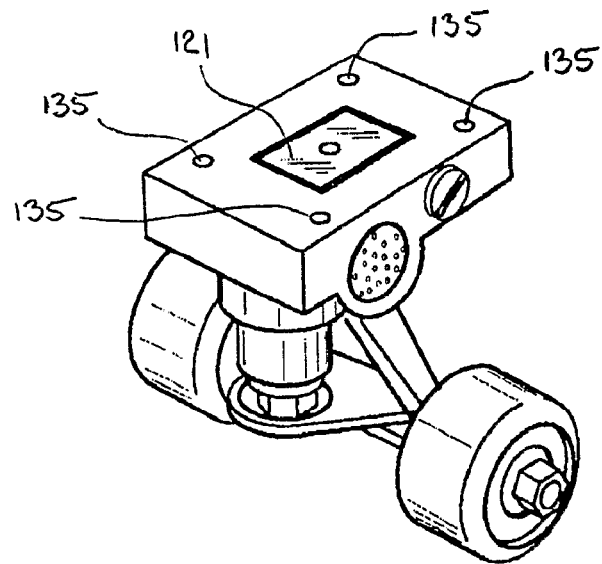
FIGS. 8 and 9 are enlargements of portions of FIG. 7.
Figure 9:
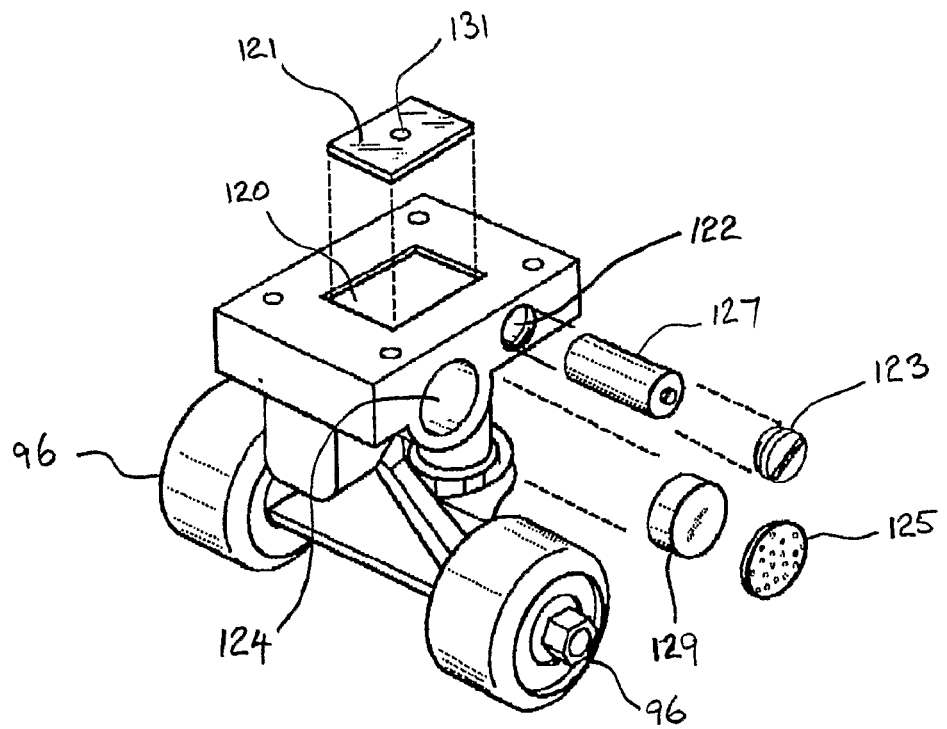
Figure 10:
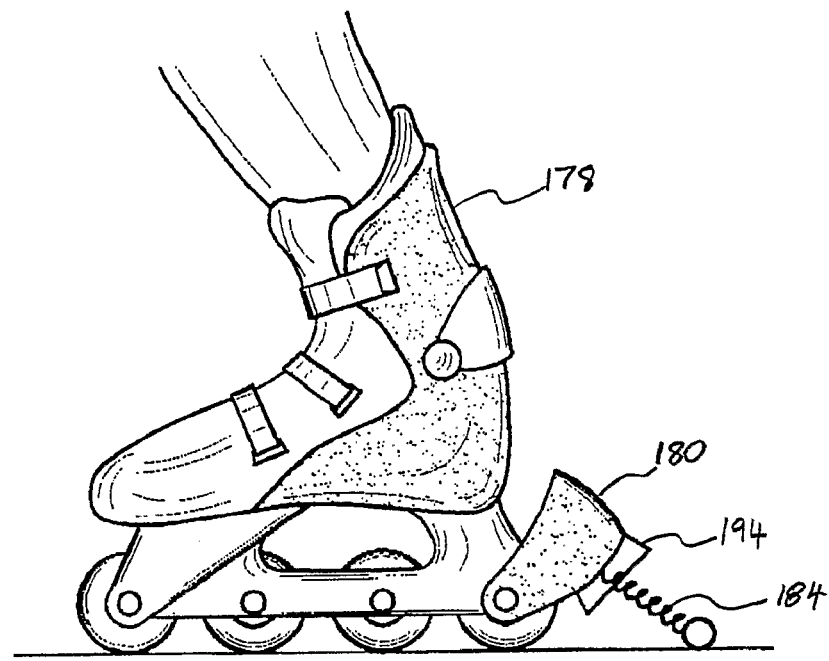
FIG. 10 is a side view of a rollerblade (in-line roller skate) incorporating an embodiment from a third adaptation of the invention.

Referring to FIGS. 7 to 9, the skateboard 90 shown therein has an upper portion, comprising a generally planar main body or deck 92 made of wood or composite polymer material, with two pairs of wheels 94 and 96 mounted on respective trucks 95 and 97 which are attached to the deck 92. Each pair of wheels 94 and 96 is attached to corresponding stub axles carried on an axle frame 102 which is in turn resiliently attached to a respective axle support 106 which is in turn rigidly attached by machine screws 108 to the underside of the deck 92.

A package comprising an electronic circuit, battery and sound emitter is accommodated within a recess 116 having a complex shape in the axle support 106.

The recess comprises a portion 120 having a rectangular cross section let into the top of the axle support in the truck. The recess 120 is sized to neatly accept the printed circuit board 121 onto which various electronic components are soldered in the side of the body portion 106.

A cylindrical cavity 122 accepts the battery 127 which is then held in place by a screw down cap which also provides the required electrical connection. Also in the side of the body portion 106 is a cylindrical cavity 124 to accommodate the piezo buzzer 129 which is then held in place by a screw-in cap 125. The cap 125 has holes therein to allow the sound to escape but which are nevertheless small enough to provide sufficient resistance to the ingress of water. The cylindrical holes 122 and 124 are let into the side of the truck which is a region of the truck where there is less likelihood of impact damage. Also the hole 124 is positioned substantially directly above the longitudinal axis of the axle of the associated wheels 96 and this position provides a substantial degree of protection against physical damage.

Affixed to the top of the overlay sheet 110 is a switch in the form of a circular pressure pad 118 having a diameter approximately 70% that of the width of the skateboard. The switch 118 is shown with two pairs of leads 119 extending therefrom, one of which passes down through respective consecutive holes 133 in the overlay sheet 110, hole 132 in the deck and hole 131 in the printed circuit board where a simple plug-on connection is made to the lower side of the printed circuit board 121. Provision for the access hole to be in the centre of the four screw holes 135 means that it is easy for a skateboard owner to locate the exact position for the holes to be drilled through the deck and cover in order to get a well aligned set o holes straight line for the leads 119. Centrally of each set of four holes 109 is also a position where there is minimum flexing of the deck so that further minimises the likelihood of damage.

Although the skateboard 90 illustrated in FIG. 7 is shown with two sound generators, one in each truck, and therefore two associated leads 119, the invention also envisages only one of the trucks having the sound generation components and therefore only a single lead 119 would be required. Of course the owners of skateboards can add the appropriate trucks and sound generation equipment singly or in pairs as they wish, and they are replaceable individually.

Figure 11:
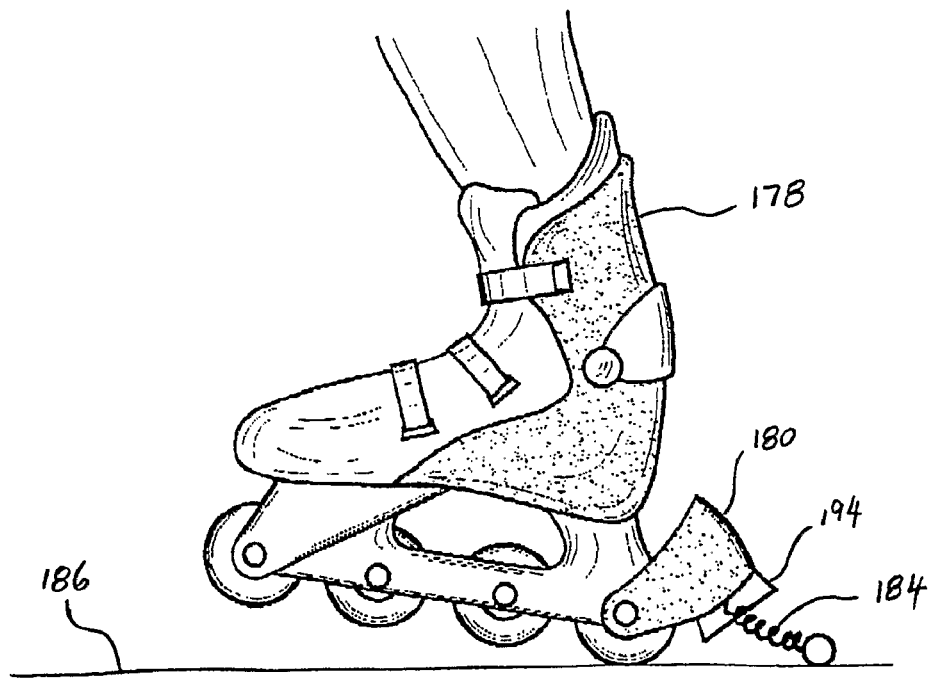
FIG. 11 is a side view showing the rollerblade of FIG. 10 tilted back to activate a warning device incorporated therein.
Figure 12:
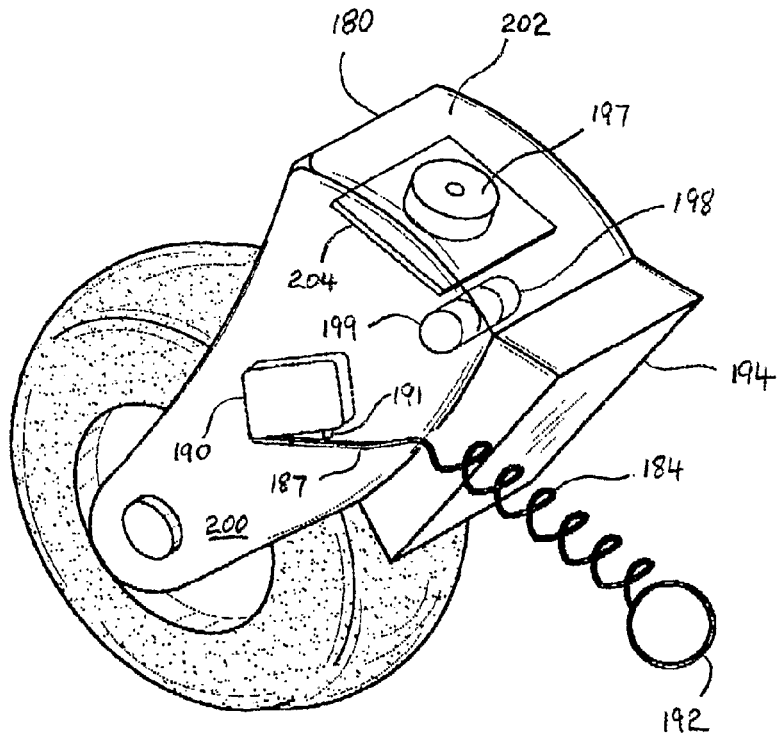
FIG. 12 is a downwardly looking perspective view of parts of the rollerblade shown in FIG. 10, showing a braking assembly and a rear rollerblade wheel positioned at its normal coasting position.
Figure 13:
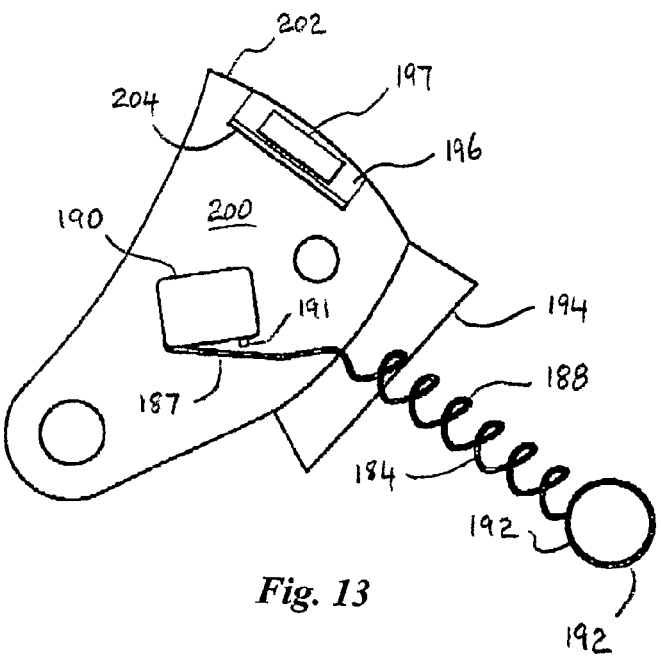
FIG. 13 is a side view of the braking assembly shown in FIG. 12.

A third broad embodiment of the invention, as adapted for use with rollerblades, will now be described with reference to FIGS. 10 to 13. The electronic circuitry, batteries, switch and sound emitter are all accommodated within or on a brake support structure 180 which extends backwards from the heel area of a rollerblade boot 178. The switch 190 is operated by a thin resilient lever 184 which extends backwards and downwards from the brake support structure 180 such that the warning/signalling sound is generated when the boot is tilted backwards (as shown in FIG. 11) such that the lever 184 is then pressed into contact with the ground 186. This contact is made before the rubber brake block 194 makes contact with the ground to provide a braking force. The warning device can thus be actuated without any braking effort being applied. The upper end of the lever 184 depresses the button 191 on the switch body 190 and this button is spring loaded to return when the lever no longer presses on it.

The lever 184 is formed from thin spring steel wire, formed at its central portion 188 into a coil spring which allows substantial deflection beyond that required for actuation of the switch 190. Such additional deflection would occur during braking. A wear resistant ball 192 of hardened steel, polyurethane or other suitable material is affixed to the free end of the lever.

Cavities 196 and 198 are provided in the brake support structure 180. One cavity 196 is let into the curved upper face 202 of the structure 180 and this contains the piezo buzzer 197 and electronics circuit board 204. Another cavity 198 is let into the side face 200 and this contains the batteries 199. Cavities 196 and 198 each have a waterproof cover of an appropriate type. Alternatively, in another version, the batteries 199 may be held in a cavity accessible via removal of the rubber brake block 194, such block being intended for removal for regular replacement. The switch 190 comprises a thin case fitted to the surface of side face 200.

Figure 14:
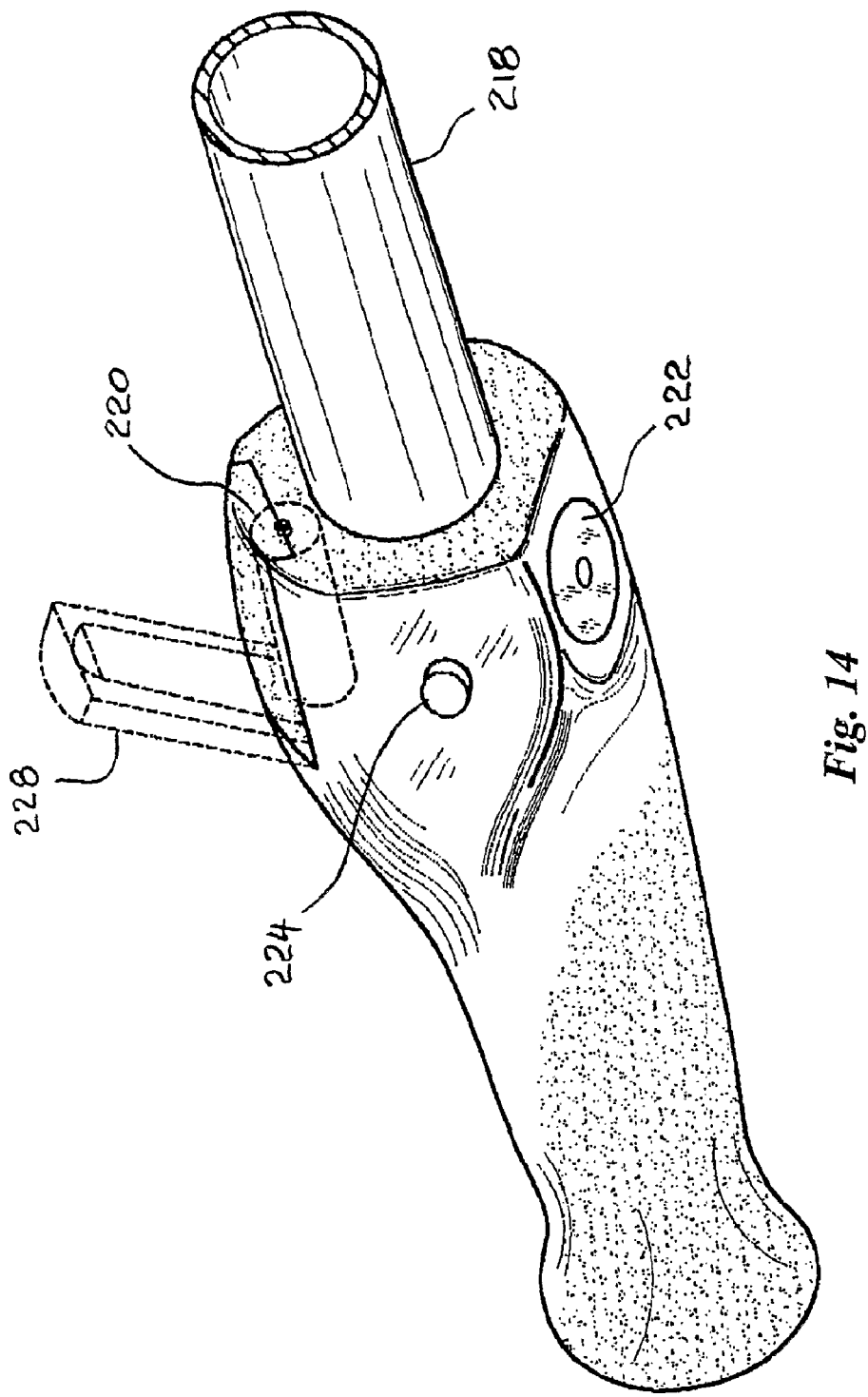
FIG. 14 is a partly-see-through perspective view of a handgrip incorporating a fourth adaptation of the invention.

Referring now to FIG. 14 the embodiment shown is a handgrip having a body with all of the componentry for creating a noise embedded into the structure of the handgrip external of the handlebar tubing. The body of the handgrip is significantly larger in bulk than the embodiments described with reference to FIGS. 1 and 3 because there needs to be sufficient thickness to the handgrip material in order to fully contain the battery 220, piezotransducer 222, switch 224, the integrated circuit (not shown), other small electronic components (not shown) and electrical connecting wires (not shown). The circuitry is the same as that shown in FIG. 2. A hinged battery cover 228 is shown in its lifted position to enable replacement of the battery 220.

To manufacture the handgrip shown in FIG. 14, all the components except the battery 220 are connected electrically and then placed in a die which is then closed and filled with the appropriate foam material. In order to be able to secure and replace the battery, a cradle is moulded in place beneath the hinged battery cover.

An advantage of this embodiment is that all the electrical connections are fairly solidly retained within the moulded handgrip. In contrast, the embodiments shown in FIGS. 1 and 3 have more exposed contacts and flimsier wiring and connections through wires 38 and conducting strip 24. However, a major disadvantage is the complexity in correctly retaining the components in place while the handgrip material is injection moulded around them.

Whilst the above description includes the preferred embodiments of the invention, it is to be understood that many variations, alterations, modifications and/or additions may be introduced into the constructions and arrangements of parts previously described without departing from the essential features or the spirit or ambit of the invention.

For example in the above described embodiments in relation to skateboards, the switch is located in a recess cut into the main body of the skateboard, but a recess may not be necessary if for example the switch used is particularly flat. Also although the above described preferred coverings for the sound emitting devices are a waterproof plastic film or the like, the invention may alternatively be covered by a perforated cover such as a wire mesh. While this would not provide a weatherproof covering, it could improve the audibility of sound produced by the sound emitter. It would be particularly applicable if the sound emitter was independently waterproof.

In the above described embodiments in relation to rollerblades, the components of the sound emitting device are carried by a brake support structure attached at the rear of the boot. The components may alternatively be incorporated elsewhere on the boot and this would be particularly applicable (although not exclusive to) when a brake block is not provided on the boot. In such a situation the lever 84 would extend downwards and backwards from either the sole of the boot or from the frame carrying the wheels.

Also, although the above described embodiments describe a buzzer as the sound emitter, the invention may alternatively use an appropriately sized loudspeaker as the sound emitter. In this way the sound emitted may be a tune or other predetermined routine of musical notes or prerecorded sound. The electrical circuitry may be arranged so that it includes an Erasable Programmable Read Only Memory (EPROM) chip which would allow users to record a tune or sound selected by them individually into the EPROM for replay when the switch is actuated.

It will be also understood that where the word "comprise", and variations such as "comprises" and "comprising", are used in this specification, unless the context requires otherwise such use is intended to imply the inclusion of a stated feature or features but is not to be taken as excluding the presence of other feature or features.

The reference to any prior art in this specification is not, and should not be taken as, an acknowledgment or any form of suggestion that such prior art forms part of the common general knowledge in Australia.

What is claimed is:

1. A bicycle handgrip slidable over an end portion of a tubular handlebar, said handgrip including a sound emitting assembly inserted into said handlebar, said sound emitting assembly comprising:
   (i) a package of electronic components comprising an electronically actuated sound generator, an electronic circuit to feed a signal to the sound generator and a source of stored electric power,
   (ii) an actuating switch separated from the package and linked to the package by an electric pathway such that when the switch is activated by the user, a sound is emitted from said handgrip distant from the switch;
   (iii) a gripping portion adapted to be retained on the outside surface of said end portion of the handlebar, and having a proximal end at or closely adjacent the end of the tube and having a distal end along the outside of the tube away from the tube end,
   (iv) said package of electronic components and electric power source adapted to be retained on the inside of the end portion of the handlebar, said package having a proximal end at or closely adjacent the end of the tube and having a distal end positioned within the end portion of tube but away from the tube end, and
   (v) said actuating switch located in said gripping portion distal of the tube end, wherein said package of electronic components and electric power source comprises a package case closed at said distal end and having a releasable end cap at said proximal end, whereby releasing said end cap permits the stored electric power source to be replaced without removal of the remainder of the package from within the tube.

2. The handgrip according to claim 1 wherein the gripping portion comprises a flexible material which overlies the switch and the switch is actuated by digitally depressing the handgrip where it overlies the switch.

3. The handgrip according to claim 2 wherein the flexible material comprises a resilient foam.

4. The handgrip according to claim 2 wherein the electric pathway comprises conducting wires or strips which pass from inside to outside the tube at the end of the tube, and pass beneath the gripping portion to the switch.

5. The handgrip according to claim 2 wherein the gripping portion is slotted or grooved to accommodate therein conducting elements which provide the electric pathway between the switch and the package of electronic components.

6. The handgrip according to claim 2 wherein said package of electronic components and electric power source includes a piezoelectric sound generator at said proximal end whereby sound emanating from the sound generator is directed out through said tube end.

7. The handgrip according to claim 1 wherein said end cap includes the piezoelectric sound generator.

8. The handgrip according to claim 1 wherein the stored electric power source comprises one or more dry cell batteries held within a frame and, with the end cap removed, the frame may be at least substantially withdrawn from within the package and the batteries replaced while the package case remains in the tube and the frame remains electrically connected to the switch.

* * * * *